United States Patent [19]

Sterk

[11] 3,714,431

[45] Jan. 30, 1973

[54] SOLAR FLARE WARNING DEVICE

[75] Inventor: Andrew A. Sterk, Berwyn, Pa.

[73] Assignee: General Electric Company

[22] Filed: June 11, 1970

[21] Appl. No.: 45,360

[52] U.S. Cl. ............250/83.3 R, 250/71.5 R, 250/86
[51] Int. Cl..............................G01t 1/16, G01t 1/20
[58] Field of Search ..............250/83.3 R, 86, 71.5 R

[56] References Cited

UNITED STATES PATENTS

| 3,546,458 | 12/1970 | Krause | 250/83.3 R |
| 3,031,576 | 4/1962 | Loy | 250/86 X |
| 3,281,811 | 10/1966 | Cotterman et al. | 250/83.3 X |

OTHER PUBLICATIONS

X-Rays From the Sun, By W. M. Neuport, from Annual Review of Astronomy and Astrophysics, Vol. 7, Copyright 1969, pgs. 121, 133–144.

Primary Examiner—Archie R. Borchelt
Attorney—Allen E. Amgott, William G. Becker, Henry W. Kaufmann, Frank L. Neuhauser, Oscar B. Waddell and Joseph B. Forman

[57] ABSTRACT

Solar flares, which produce radiation potentially dangerous in space or at high altitudes in the upper portions of the earth's atmosphere, are signalled initially by the appearance of radiation at about 1.8 Angstroms, which precedes by a substantial fraction of an hour the increase in intensity of the flare to dangerous levels. A device selectively sensitive to radiation of this wavelength is connected to an alarm device whose operation gives sufficient warning to permit space travelers to seek shelter within protective shield before the radiation reaches dangerous levels, or alternatively gives aircraft flying at high altitudes warning in adequate time for them to descend to altitudes of about 50,000 feet or less, at which altitude the absorption by the atmosphere above that level is adequate protection.

1 Claim, 1 Drawing Figure

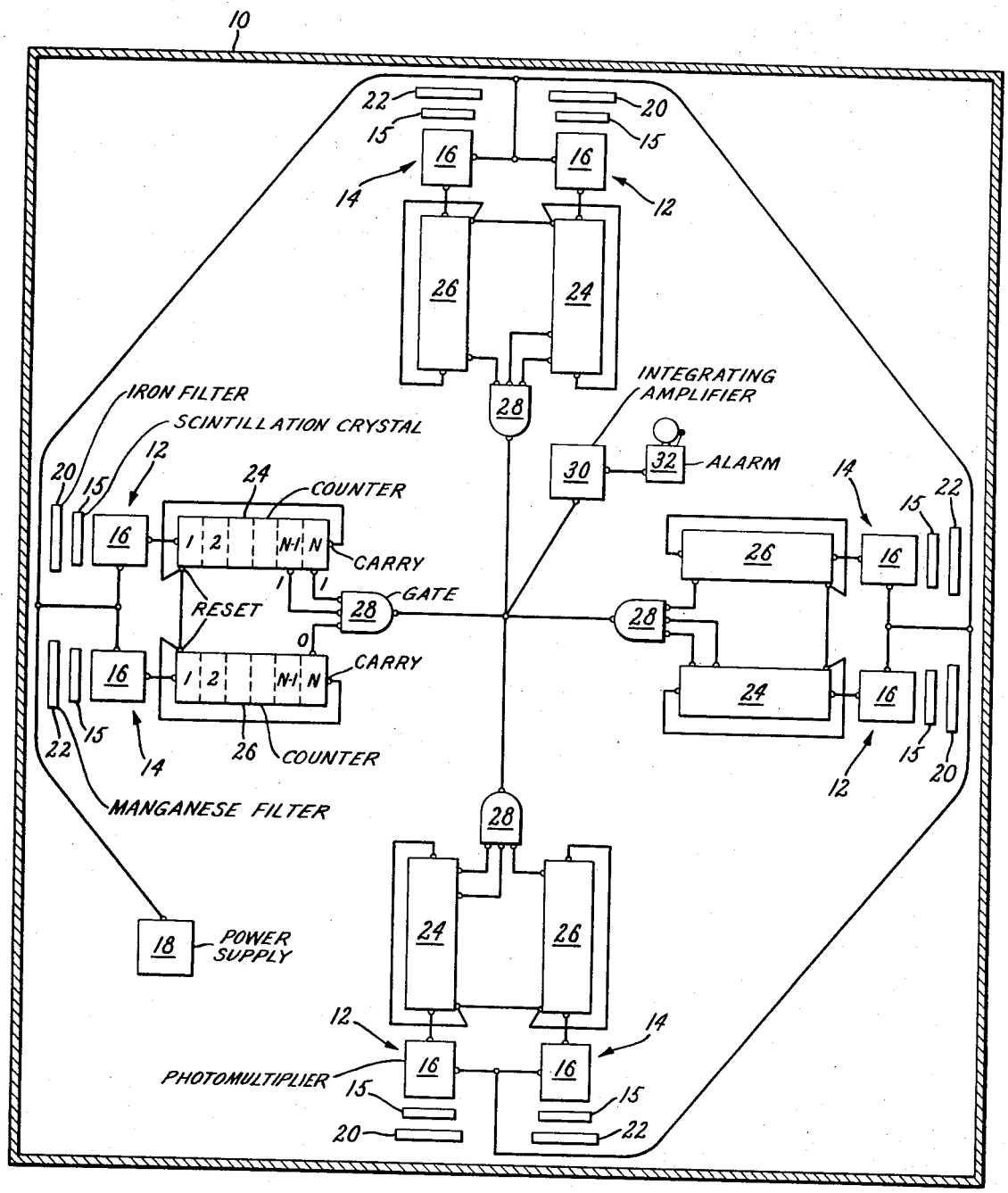

SOLAR FLARE WARNING DEVICE

BACKGROUND OF THE INVENTION

1. Field of the Invention

This invention pertains to detection of electromagnetic radiation.

2. Description of the Prior Art

While the hazard of radiation from solar flares occurring during space travel has been recognized, no prior art solution to the problem it creates is known.

SUMMARY OF THE INVENTION

In the Annual Review of Astronomy and Astrophysics, Vol. 7, 1969, an article entitled X Rays From the Sun, by W. M. Neupert, Solar Physics Branch, Laboratory for Space Sciences, Goddard Space Flight Center, Greenbelt, Maryland pages 121 through 144, describes at page 134 thereof, with illustrations at FIG. 7 (page 136) and FIG. 10 (page 140) how the initial radiation at the beginning of a solar flare is marked by a strong peak in the region from 1.8 to 1.9 Angstroms, with a maximum at 1.87 Angstroms. This strong peak precedes by a time of the order of twenty minutes the increase of radiation at other wavelengths to intensity levels which may be expected to be injurious to space travelers in the interior of a space vehicle which is shielded only by light structural materials.

Ideally, the embodiment of my invention may consist of a radiation detector exposed to the general environment within the spacecraft by a selective filter having relatively good transmission in the 1.8 to 1.9 Angstrom region which is connected to a suitable alarm system so that, upon the appearance of the first intense radiation at that wavelength, the alarm is operated and gives warning to the space travelers to seek protection within shielded areas provided within the space craft for such purposes, or to pilots of aircraft flying at high altitudes (e.g. 65,000 feet or more) so that they may descent to adequately safe altitude of 50,000 feet or less. In practice, it is simpler to utilize two filters, one a thin layer of manganese, the other a thin layer of iron.

Since the atomic number of manganese is 25, and that of iron is 26, they both show very similar absorption curves for gamma radiation, with a mass absorption coefficient which, in general, increases with increasing wavelength. However, it is well known in the art that at the wavelength at which the quantum energy is not sufficient to eject a K electron, there is a sudden sharp decrease in the absorption (the K absorption edge), with increasing wavelength. For manganese this wavelength is about 1.89 Angstroms, and for iron it is about 1.74 Angstroms. Thus, if the relative thicknesses of the manganese and the iron filters are adjusted so that their absorption is substantially matched at wavelengths outside of the band between 1.74 and 1.89 Angstroms, within that band the iron filter will have a substantially lower absorption than will the manganese filter. ("Nuclear Physics," Robert A. Howard, Wadsworth Publishing Company, Inc., Belmont, California, 1963, L. C. Cat. Card 62–17901, FIG. 8–7, page 264, illustrates the general nature of the absorption curve and the K absorption edge.) A radiation detector is placed behind each such filter, and the electrical outputs of the two detectors are combined in opposition, so that the equal signals which they will produce, for radiation outside the specified band, will annul each other; but radiation inside the specified band will produce a larger output in the detector associated with the iron filter than it will produce in the detector associated with the manganese filter. The unequal outputs will not cancel each other, and a net output will result, which may be applied to operate some suitable alarm device.

BRIEF DESCRIPTION OF THE DRAWING

A schematic representation of the device in its environment of use is represented in the single drawing.

DESCRIPTION OF THE PREFERRED EMBODIMENT:

In the figure, within the schematically represented space vehicle or high-altitude aircraft structure, 10, shown in section, there is represented a plurality of pairs of scintillation detectors 12 and 14, each of which is represented as comprising a scintillation crystal 15 which may be of thallium-activated sodium iodide conventional for such use; in close proximity to a photomultiplier tube 16, also conventional for such use. Each photomultiplier tube 16 is represented as connected to a power supply 18.

Each detector 12 views a particular solid angle of space through an iron filter 20 and a detector 14 paired with it views the same solid angle of space through manganese filter 22. Both 20 and 22 may be formed conveniently by vacuum evaporation upon substrates of organic plastic; such a process permits very close adjustment of the transmission of the evaporated layer, so that the transmission of filters 20 and 22 of a pair may readily be made equal outside the wavelength band of interest. In practice, a thickness of about one-fourth of a milli-inch of metal is suitable.

Under the conditions stated, radiation outside of the wavelength band of interest will give approximately equal counting rates in a detector 12 and its paired detector 14; but radiation inside the wavelength band of interest will give a higher counting rate on the detector 12 than on its paired detector 14. It is possible to employ conventional pulse shapers to cause each pulse in a detector 12 or 14 to produce a standardized amplitude and duration of output pulse which is then stored in an integrating circuit (which may consist primarily of a capacitor large enough to give a time constant of several seconds) so that the potential appearing in the output of the integrating is a measure of the average counting rate. Such devices are will known in the art; in "Radioactivity Measuring Instruments" by M. C. Nokes, Philosophical Library, New York City, N. Y., 1958, Chapter Six is entitled "Counting Rate Meters (Ratemeters)" and discusses the use of such meters. It would be possible to provide detector 12 and its paired detector 14 with such ratemeters, and connect their outputs in opposition so that equal counting rates on both counters would produce equal opposed output voltages which would cancel each other. This is, however, not the method I prefer because its accuracy is limited. While its relative simplicity suggests that it could result in somewhat less complex and weighty auxiliary apparatus, the present availability of very compact and highly reliable semiconductor digital counters and similar devices renders a more sophisticated and more precise approach preferable.

This is accomplished as follows. The output of detector 12 is connected to a counter 24, which may most conveniently be a succession of binary counter stages. The output of detector 14 is connected to a similar counter 26. Each such counter is provided with a reset terminal to which a signal may be applied to set all the counter stages to zero, thus clearing it to begin a given count. Assuming this has been done, the counter 24 will count the pulses from detector 12, and counter 26 will count the pulses from paired detector 14. If both detector 12 and detector 14 are counting at the same rate, the reading or content of counters 24 and 26 will be approximately the same (within the difference resulting from the stochastic nature of the operation) at any time; and ultimately the final stage of counter 24 or counter 26 will contain a "one," indicating that counter is nearly full. When either of paired counters 24 or 26 becomes full, its last stage will be reset to zero, and (in accordance with conventional counter design) will generate a carry pulse adapted to trigger a succeeding stage. The carry or trigger pulse outputs from the last stages of paired counters 24 and 26 are both connected to the reset terminals of both of the paired registers 24 and 26. This insures that, regardless of which register, 24 or 26, first becomes full (and thus automatically reset to zero in all stages, beginning a new count) the other register will also be automatically reset at that time. This is necessary to insure that the content of one register acquired during one counting period will not erroneously be compared with the content of the other register of the pair acquired during a preceding or subsequent counting period. It would be possible to provide a clock pulse which would reset the paired registers at an appropriate time; but this would require the assumption of a counting rate to determine at what time intervals the counters would be approaching their limit, while the method here described requires no such assumption, and adapts itself automatically to varying counting rates.

Means must be provided for detecting a substantial difference between the number of counts stored in counter 24 and the number stored in counter 26. Since they may differ briefly by small amounts even when the counting rates of detectors 12 and 14 are substantially the same, it is not useful to compare the readings of all their stages to detect a difference; not is it useful to compare the state of only the most significant stage of the paired counters 24 and 26, since a difference of only one count might cause these to be different. If, however, the most significant stage of counter 26 is zero when the correspondingly valued stage of counter 24 and the next less significant stage both contain ones, then there is approximately a two to one difference in their readings, although this ratio will decrease with increased numbers of stages in both counters. For a given number of stages, the ratio of numbers stored in the two counters which is detected as significant may be increased by increasing the number of adjacent stages, beginning with the most significant, which are required by this criterion to be one in counter 24 and zero in counter 26.

The criterion is applied in the embodiment very simply, by gating together in gate 28 the "one" outputs of the selected stages of counter 24, and the "zero" outputs of counter 26. The output of each such gate 28 is then fed to a common integrating amplifier 30 (which may conveniently have a time constant of about ten seconds in its integrating circuit) whose output is connected to an alarm device 32, here represented conventionally as a bell, although it may have any suitable form.

It is evident from the preceding description that, when the equipment is first placed in operation, assuming the absence of radiation in the wavelength band of interest, each pair of detectors 12 and 14, since they are "looking" in the same direction, will see similar radiation, and will count at approximately the same rate until one of their registers 24 or 26 is full, whereupon both registers will be reset and start a new counting period. Other pairs of detectors 12 and 14, facing differently, may count at a rate different from the first pair, and will thus have a different common counting period. If, however, the appearance of radiation in the wavelength band of interest causes any detector 12 to count at a significantly higher rate than its paired detector 14, this significant difference will be detected by the gate 28 connected to that pair's registers 24 and 26, and will transmit an output to integrating amplifier 30. Since the phenomena under consideration are stochastic, random variations between the counters of a detector 12 and its paired counter 14 may occasionally produce such an output from a gate 28; but the actual presence of significant amounts of the radiation which it is desired to detect will produce repeated outputs from a gate 28, which integrating amplifier will integrate over a period of time to produce a sum which will cause an output effective to cause the operation of alarm device 32.

To facilitate the relation of the recitals of the appended claims to the embodiment disclosed, the following definitions in terms of the entities in the embodiment are given. A pair of detectors 12 and 14, with their associated filters 20 and 22, constitute detection means for selectively detecting radiation quanta in the wavelength band from 1.74 to 1.89 Angstroms. Counters 24 and 26 connected to those detectors constitute rate means; and the gate 28 connected to the outputs of those counters constitutes comparison means. Alarm means are represented by the schematically represented bell 32. Integrating amplifier 30 provides integrating means. More specifically, a detector 12 and its associated filter 20 is detection means sensitive to radiation within the specified wavelength band and above it; and a detector 14 and its associated filter 22 is detection means insensitive to radiation within the specified wavelength band, but sensitive to radiation above it. The term "insensitive" is to be construed as relative to the sensitivity of detector 12 and its associated filter 20. Counters 24 and 26 are, respectively, first and second counter means which are comprised in the term "rate means."

It should be observed that the representation of a plurality of pairs of detectors 12 and 14 and their ancillaries is merely a way of indicating that a sufficient number os such pairs may be provided so oriented that their total field of view covers an entire sphere. A single pair provided with some means to insure that the sun would always lie within their common field of view would suffice for the purposes of the invention; but the necessary complexity of the additional orientation means required causes me not to prefer it.

What is claimed and desired to be secured by Letters Patent is:

1. A device for warning of the imminence of a solar flare, comprising:
   a first detection means sensitive to radiation within the wavelength band 1.74 to 1.89 Angstroms and above the said wavelength band, and
   a second detection means insensitive to radiation within the specified wavelength band, but sensitive to radiation above the said wavelength band;
   rate means which comprises first counter means for counting the detections by the first detection means and second counter means for counting the detections by the second detection means during the same period of time, and
   comparison means which comprises means for producing a signal when the number stored in the first counter means exceeds that stored in the second counter means by at least a predetermined ratio,
   connected to alarm means operative responsively to the said signal.

* * * * *